(12) United States Patent
O'Donnell et al.

(10) Patent No.: US 10,115,414 B1
(45) Date of Patent: Oct. 30, 2018

(54) DJ CONTROL DISC CONFIGURATION OPTIMIZED FOR DJ PERFORMANCE

(71) Applicant: InMusic Brands, Inc., Cumberland, RI (US)

(72) Inventors: John O'Donnell, Fort Lauderdale, FL (US); Scott Puckett, Pawtucket, RI (US); Ross H. Goodwin, Riverside, RI (US); Christopher Roman, Wrentham, MA (US)

(73) Assignee: inMusic Brands, Inc., Cumberland, RI (US)

( * ) Notice: Subject to any disclaimer, the term of this patent is extended or adjusted under 35 U.S.C. 154(b) by 0 days.

(21) Appl. No.: 15/641,507

(22) Filed: Jul. 5, 2017

(51) Int. Cl.
*G11B 3/60* (2006.01)
*G11B 19/28* (2006.01)
*G11B 19/20* (2006.01)

(52) U.S. Cl.
CPC ............... *G11B 3/60* (2013.01); *G11B 19/20* (2013.01); *G11B 19/28* (2013.01)

(58) Field of Classification Search
None
See application file for complete search history.

(56) References Cited

U.S. PATENT DOCUMENTS

| | | | | |
|---|---|---|---|---|
| 1,334,690 A | * | 3/1920 | Davis | G11B 19/2009 369/264 |
| 4,247,976 A | * | 2/1981 | Reuter | G11B 3/60 29/527.4 |
| D433,011 S | * | 10/2000 | O'Donnell | D14/202 |
| 8,116,892 B2 | * | 2/2012 | Huang | G10H 1/0091 700/94 |
| 2003/0012125 A1 | * | 1/2003 | Santos | G11L 317/02 720/718 |
| 2004/0079623 A1 | * | 4/2004 | Kataoka | G10H 1/0091 200/19.03 |
| 2004/0085865 A1 | * | 5/2004 | Kataoka | G10H 1/0091 369/30.36 |
| 2005/0052981 A1 | * | 3/2005 | Shim | G11L 319/00 369/59.26 |
| 2005/0188395 A1 | * | 8/2005 | Liu | G11L 319/00 720/696 |
| 2007/0079315 A1 | * | 4/2007 | Mittersinker | G10H 1/0091 720/656 |
| 2009/0164033 A1 | * | 6/2009 | Huang | G10H 1/0091 700/94 |
| 2009/0320670 A1 | * | 12/2009 | Flum | G10H 1/0091 84/723 |

(Continued)

FOREIGN PATENT DOCUMENTS

GB 2106300 A * 4/1983 ......... G11B 19/2009
GB 2405686 A * 3/2005 ........... G10H 1/0091

*Primary Examiner* — William J Klimowicz
(74) *Attorney, Agent, or Firm* — Barlow, Josephs & Holmes, Ltd.

(57) ABSTRACT

The turntable platter configuration of the present invention includes a groove on the platter edge about its periphery to allow for an improved ergonomic finger control for a DJ to alter the speed of the platter rotation. The turntable platter configuration also includes a regularly spaced shape about the periphery of the platter to be used with a strobe for allowing the user to ensure the rate of the rotation is at the appropriate speed, such as 33 RPM or 45 RPM.

8 Claims, 8 Drawing Sheets

(56) References Cited

U.S. PATENT DOCUMENTS

2013/0123961 A1* 5/2013 Roman ................ G10H 1/0008
700/94
2016/0189699 A1* 6/2016 Garet ....................... G10H 1/32
382/119

* cited by examiner

DJ CONTROL DISC CONFIGURATION OPTIMIZED FOR DJ PERFORMANCE

CROSS REFERENCE TO RELATED APPLICATION

N/A

BACKGROUND OF THE INVENTION

The invention relates generally to audio turntables. In particular, the present invention relates to such turntables that are used by a disc jockey (DJ) for vinyl playback.

In the prior art, audio turntables for vinyl playback are very well known. They include a rotating platter that receives the vinyl disc thereon. A tone arm assembly, with a tone arm and cartridge, interfaces with the vinyl record so that audio signals can be created therefrom to the produce the desired audio. The rotating platter of the turntable that holds the vinyl typically has a beveled or straight edge. The design of this edge for an operator who is only listening to a record is primarily cosmetic.

Figure 1:
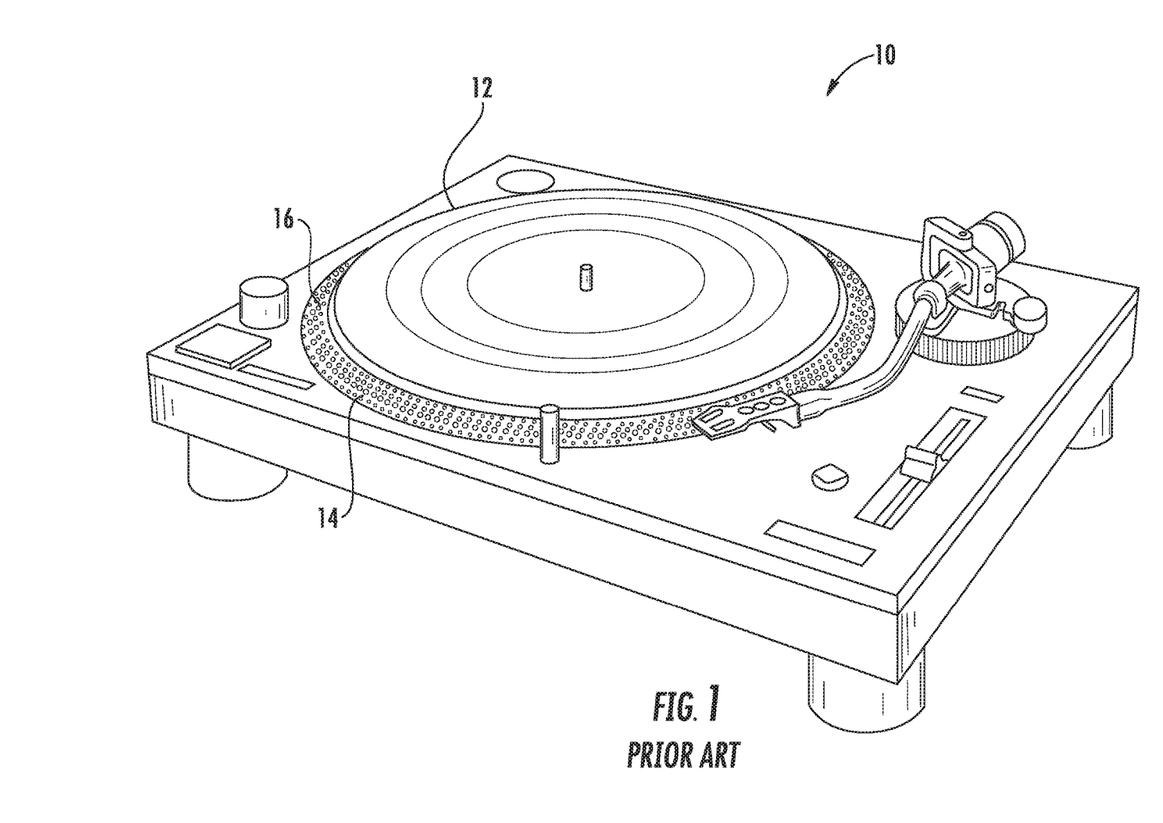
FIG. 1 is a perspective view of a prior art turntable with a known platter configuration.
Figure 2:
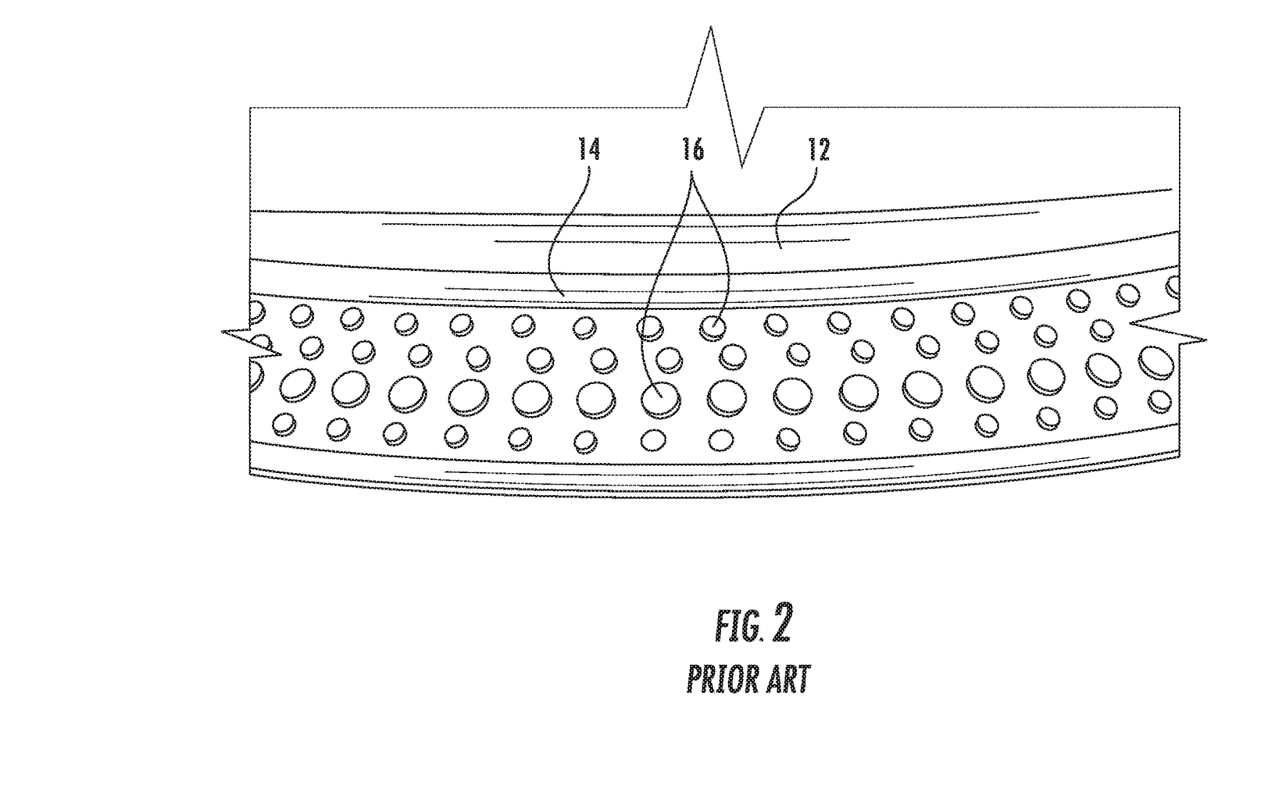
FIG. 2 is a close-up perspective view of the known prior art platter of FIG. 1.

However, there are some turntable platters that contain regularly spaced dots or other shapes that, when strobed with a light, could inform the user of whether the platter was turning at a specific rate. For example, as shown in FIG. 1, the well-known Technics SL1200 turntable, referenced as 10, has a platter 12 with an edge 14 that is of a beveled shape with regularly spaced dots 16 thereon, which are typically in relief. These dots and other shapes 16 make the platter 12 not just cosmetic but also visually functional. As is very well-known in the industry, these regularly spaced shapes are used with the strobe to indicate whether the platter is rotating with zero pitch relative to current speed of 33 revolutions per minute (RPM) or 45 RPM. A close-up front view of the relief dots 16 of a Technics SL1200 is shown in FIG. 2 while a side elevational view of the peripheral edge 14 of the prior art platter 12 is shown. Another example of a prior art turntable that includes spaced apart structures is the Numark TTX turntable, which has a beveled platter edge design with regularly spaced pills thereon.

Figure 3:
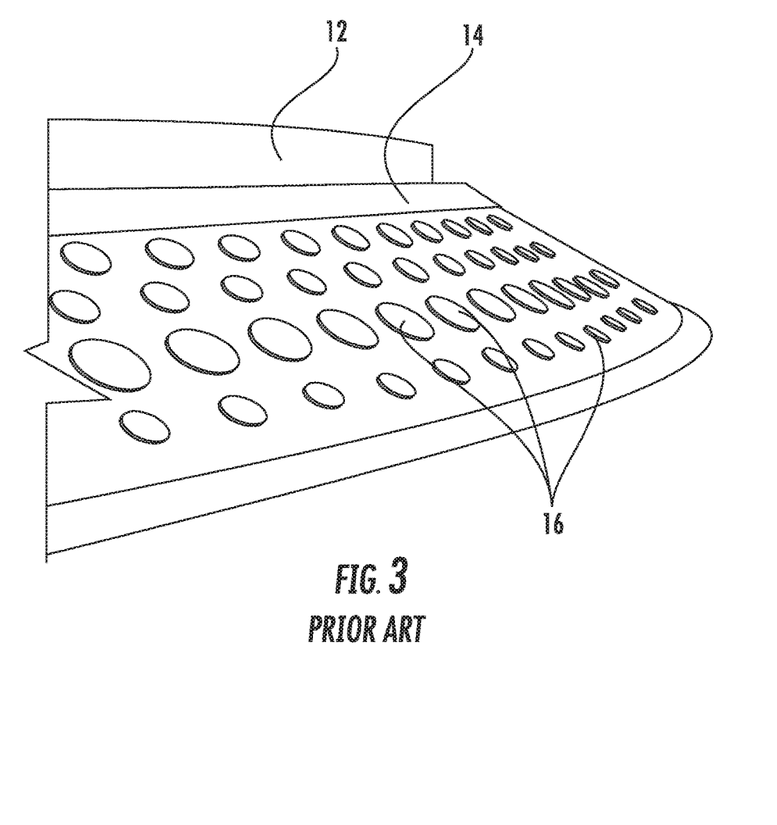
FIG. 3 is a side elevational view of the prior art turntable platter shown in FIG. 1.

However, a DJ often forcibly changes the speed of the rotating platter by placing a finger or fingers on the edge of the platter to slightly change, such as slow down or speed up, the rate of the rotating platter momentarily. For example, this is done by DJs for beat matching purposes during a performance. Since the strobe dots are typically in relief, they can be somewhat abrasive to the touch, particularly when they are running past the fingers of a DJ. Therefore, turntables with platters, with the usual strobe or ornamental relief structures, can be uncomfortable for a DJ during DJ performance. This can be clearly understood with reference to the side elevational view of a prior art platter of FIG. 3.

The prior art is devoid of platter configuration for a vinyl turntable that is well-suited for a DJ performance. There are currently no ergonomic platter configurations that meet the need of the DJ to alter the rate of rotation using finger control in a comfortable fashion.

In view of the foregoing, there is a need for a rotating platter for a vinyl turntable that is well-suited for a DJ performance. There is a need for an improved turntable platter configuration that is optimized for a DJ performance. There is a need for a turntable platter configuration that operates in the usual fashion while also provided the aforesaid optimized configuration for DJ performance.

SUMMARY OF THE INVENTION

The present invention preserves the advantages of prior art turntables and platter configurations used therewith. In addition, it provides new advantages not found in currently available turntable platter configurations and overcomes many disadvantages of such currently available turntable platter configurations.

The invention is generally directed to the novel and unique turntable platter configuration. The turntable platter configuration of the present invention includes a platter construction that is configured with an edge profile that is optimized for DJ performance. The turntable platter includes a groove on the platter edge about its periphery to allow for an improved ergonomic finger control for a DJ to alter the speed of the platter rotation. The turntable platter of the present invention also includes regularly spaced shapes about the periphery of the platter that may be used with a strobe for allowing the user to ensure the rate of the rotation is rotating with zero pitch relative to the current desired speed of, for example, 33 RPM or 45 RPM. The regularly spaced shape may be of any shape, such as a linear or pill-shaped channel.

It is, therefore, an object of the present invention to provide a rotating platter for a vinyl turntable that is better suited for a DJ performance than prior art turntable platters.

Another object of the present invention is to provide an improved turntable platter configuration that is optimized for DJ performance.

Yet another object of the present invention is to provide a turntable platter that can operate in the usual fashion and also provide strobe monitoring of the speed of the turntable platter.

BRIEF DESCRIPTION OF THE DRAWING FIGURES

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE INVENTION

Figure 4:
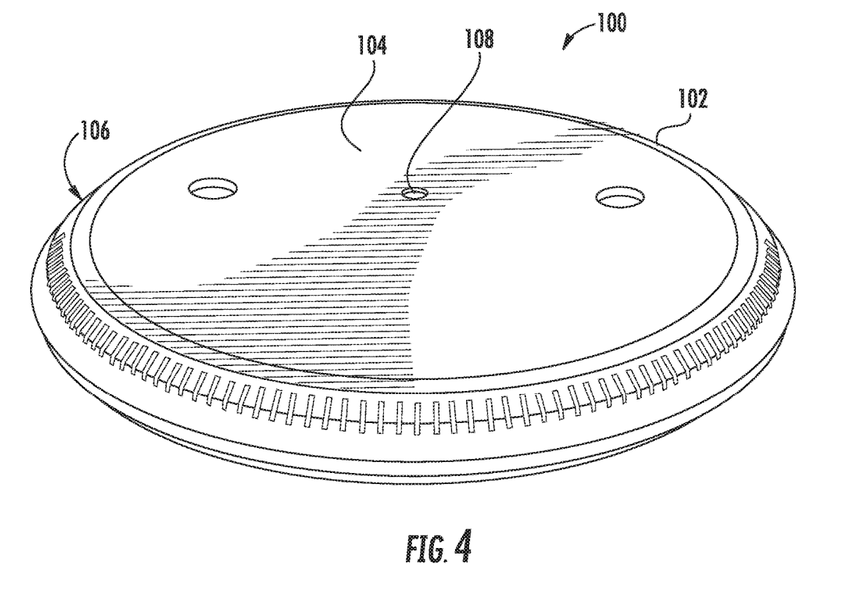
FIG. 4 is a front perspective view of the turntable platter of the present invention.
Figure 5:
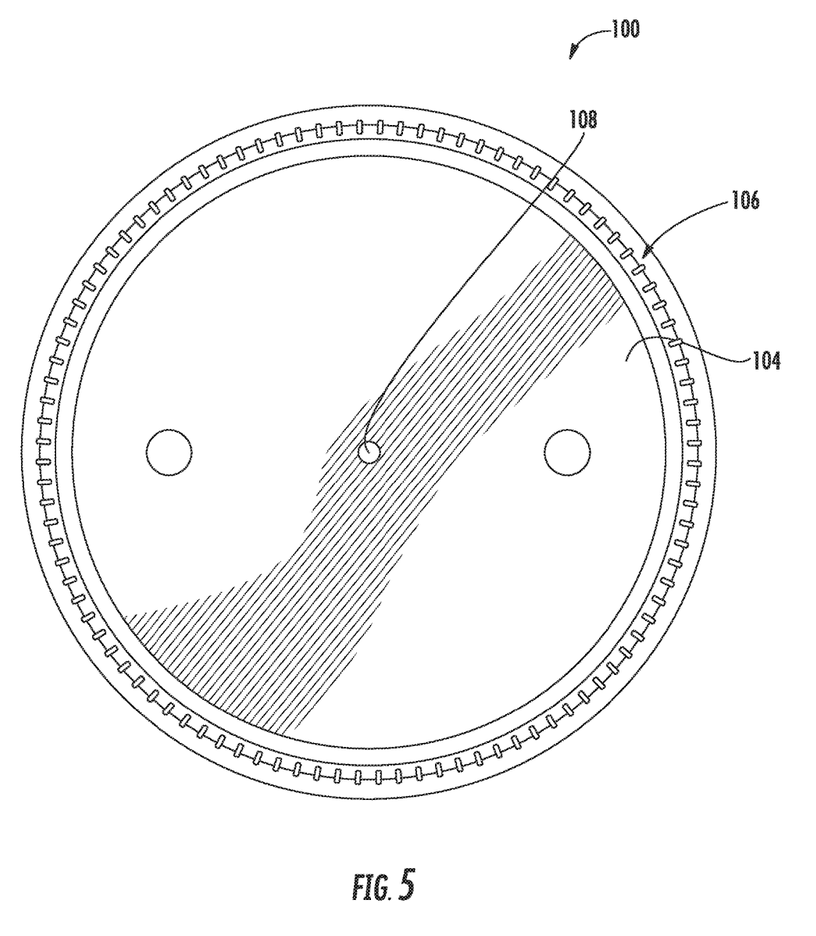
FIG. 5 is top view of the turntable platter of FIG. 4.
Figure 6:
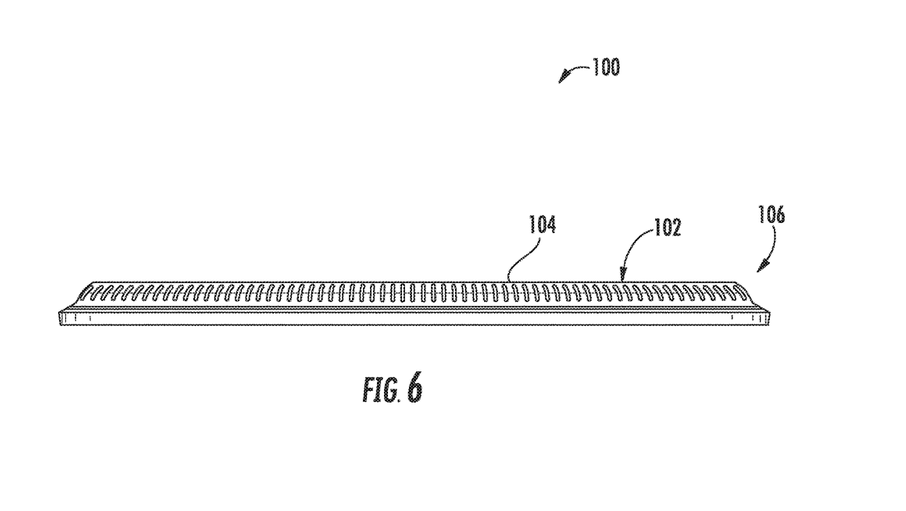
FIG. 6 is a side elevational view of the turntable platter of FIG. 4.
Figure 7:
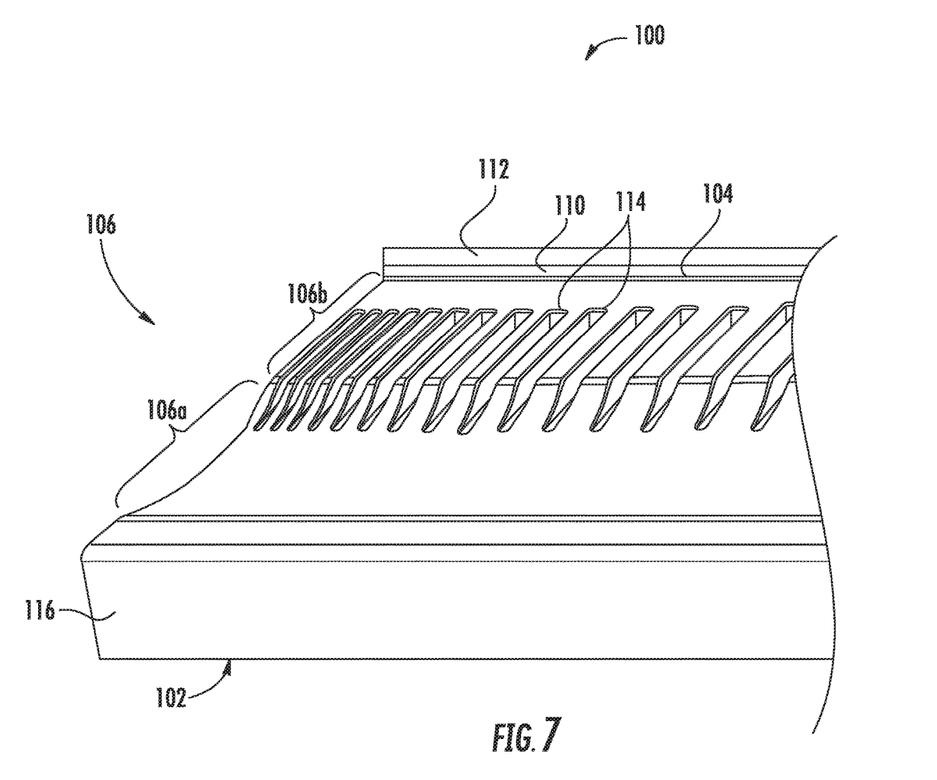
FIG. 7 is a close-up side elevational view of the turntable platter of FIGS. 4.

Turning first to FIG. 4, a front perspective view of the new DJ turntable platter 100 of the present is shown. A top view of the platter is shown in FIG. 5 while a side elevational view of the platter is shown in FIG. 6. FIG. 7 shows a close-up elevational view of the peripheral edge of the inventive DJ turntable platter of the present invention.

As seen in FIGS. 4-6, it can be seen that the platter 100 of the present invention includes a disc 102 with a top surface 104 and a peripheral edge, which is generally referred to as 106. A center hole 108 is also provided for installing the platter 100 to a turntable for use, which is very well known in the art and need not be discussed further herein. The top surface 104 is configured for the usual receipt of a slipmat 110 or other interim structure to the support a vinyl record 112 thereon.

Referring now to FIG. 7, details of the inventive edge peripheral profile of the platter 100 of present invention is shown in detail. The platter 100 is in the form of a disc 102 that includes an upper surface 104 which preferably supports a slipmat 110 and a vinyl record 112 thereon. The setup a turntable platter for a DJ is so well known in the art that it need not be discussed in further detail herein.

As to the platter 100 itself, the disc 102 includes an edge 106 with a unique profile that can be seen in FIG. 7. The edge 106 includes a lower portion 106a and an upper portion 106b. The disc 102 preferably also includes a base region 116. The lower portion 106a has a groove-like profile about the periphery of the disc 102. The lower portion 106a is also preferably concave to provide the groove-like profile but may be of many different types of profiles to provide a more comfortable interface with a DJ. The edge 106 also includes an upper portion 106b that carries a strobe relief pattern 114 thereon, which is preferably in the form of channels that are positioned transversely across the peripheral edge 106. Such a relief pattern may be provided for ornamental purposes only instead. FIG. 7 shows some of the relief pattern 114 in the lower portion 106a. However, is possible that the lower portion 106a is completely devoid of any strobe relief pattern structures 114.

Figure 8:
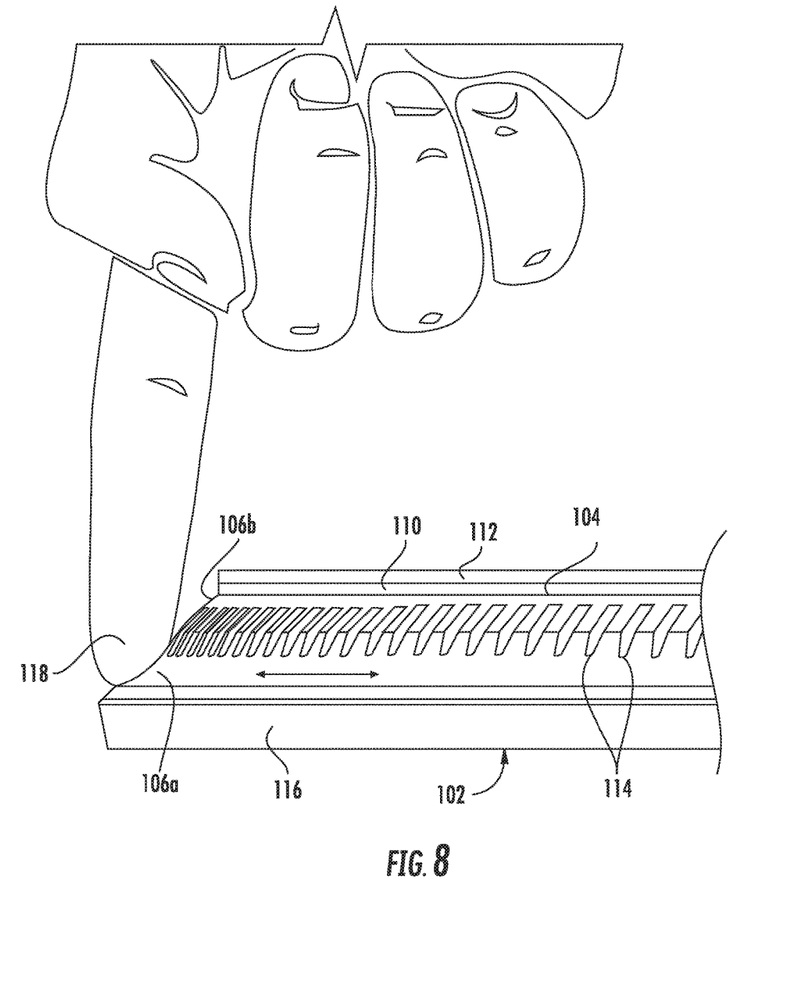
FIG. 8 is a side elevational view of the turntable platter of the present invention in use by a DJ.

The use and operation of the turntable platter of the present invention is shown in detail in FIG. 8. The disc 102 is rotated by the appropriate motor within the turntable, which is not shown in FIG. 8. An operator DJ communicates with the peripheral edge 106 of the turntable platter typically with their finger (or fingers) 118. In accordance with the present invention, the DJ's finger 118 is placed in the peripheral groove defined by the lower portion 106a of the peripheral edge 106 of the platter 100. The DJ's finger comfortably rests in the groove of lower portion 106a while the turntable platter 100 is rotating during a DJ performance, as represented by the double arrow. A DJ may also use their finger to interact with the platter 100 while it is not rotating. Thus, the DJ's finger interfaces with the peripheral edge 106 in a more ergonomic and comfortable fashion thereby making the overall operation of the turntable platter more enjoyable for the DJ while improving their overall DJ performance.

The new inventive DJ platter configuration and construction may be carried out and used in a wide array of types of turntables to improve a DJ performance. The inventive platter peripheral edge 106 may be incorporated into a platter 100 of any material but is preferably well-suited for use in a platter 100 made of metal.

It would be appreciated by those skilled in the art that various changes and modifications can be made to the illustrated embodiments without departing from the spirit of the present invention. All such modifications and changes are intended to be covered by the appended claims.

What is claimed is:

1. A DJ control disc, comprising:
an axis of rotation, a top surface, an outer peripheral edge about a circumference of the disc;
the peripheral edge defining a groove that extends about the entirety of the circumference of the disc; and
the peripheral edge further includes an upper portion extending axially downward from the top surface and the groove extending axially downward from the upper portion;
wherein the upper portion linearly slopes downward and radially outward from the top surface defining a bevel,
wherein the groove includes a cross section that extends through a plane which is perpendicular to the top surface and parallel to the axis of rotation, the cross section having a concave curved arc shape, and
whereby the groove being configured and arranged for removable receipt a finger of an operator, when the disc is rotated about its axis of rotation, so that the operator can manually control rotation of the disc about the axis of rotation.

2. The DJ control disc of claim 1, wherein the upper portion including a strobe pattern thereon which is configured for strobe monitoring of the speed of the disc.

3. The DJ control disc of claim 2, wherein the strobe pattern is in relief.

4. The DJ control disc of claim 2, wherein the strobe pattern includes channels positioned transversely across the upper portion of the peripheral edge.

5. The DJ control disc of claim 4, wherein each of the channels of the strobe pattern extend along both the upper portion and the groove of the peripheral edge.

6. The DJ control disc of claim 4, wherein the groove is devoid of the strobe pattern.

7. The DJ control disc of claim 1, wherein the top surface is configured and arranged for supporting a vinyl record.

8. The DJ control disc of claim 1, wherein the groove is smooth about an entire periphery of the disc.

* * * * *